United States Patent
Daoud

[19]

[11] Patent Number: 6,118,868
[45] Date of Patent: Sep. 12, 2000

[54] COMPACT MODULAR LAYERED NETWORK INTERFACE UNIT

[75] Inventor: Bassel Hage Daoud, Parsippany, N.J.

[73] Assignee: Lucent Technologies, Inc., Murray Hill, N.J.

[21] Appl. No.: 09/143,314

[22] Filed: Aug. 28, 1998

[51] Int. Cl.$^7$ .................................................... H04M 1/00
[52] U.S. Cl. ................................................................. 379/399
[58] Field of Search .................................... 379/399, 325, 379/326, 327, 328; 361/356

[56] References Cited

U.S. PATENT DOCUMENTS 4,949,376   8/1990   Nieves et al. ............................ 379/399
5,363,440  11/1994   Daoud ..................................... 379/399

*Primary Examiner*—Jack Chiang
*Attorney, Agent, or Firm*—Howard C. Miskin; Gloria Tsui-Yip

[57] ABSTRACT

A network interface unit with a base is disclosed and has a plurality of modular layers mountable on each other in a consecutive manner with each layer having provisions for being hinged. The first modular layer folds over the base and the second modular layer folds over the first modular layer in a manner so as to provide a compact network interface unit.

13 Claims, 5 Drawing Sheets

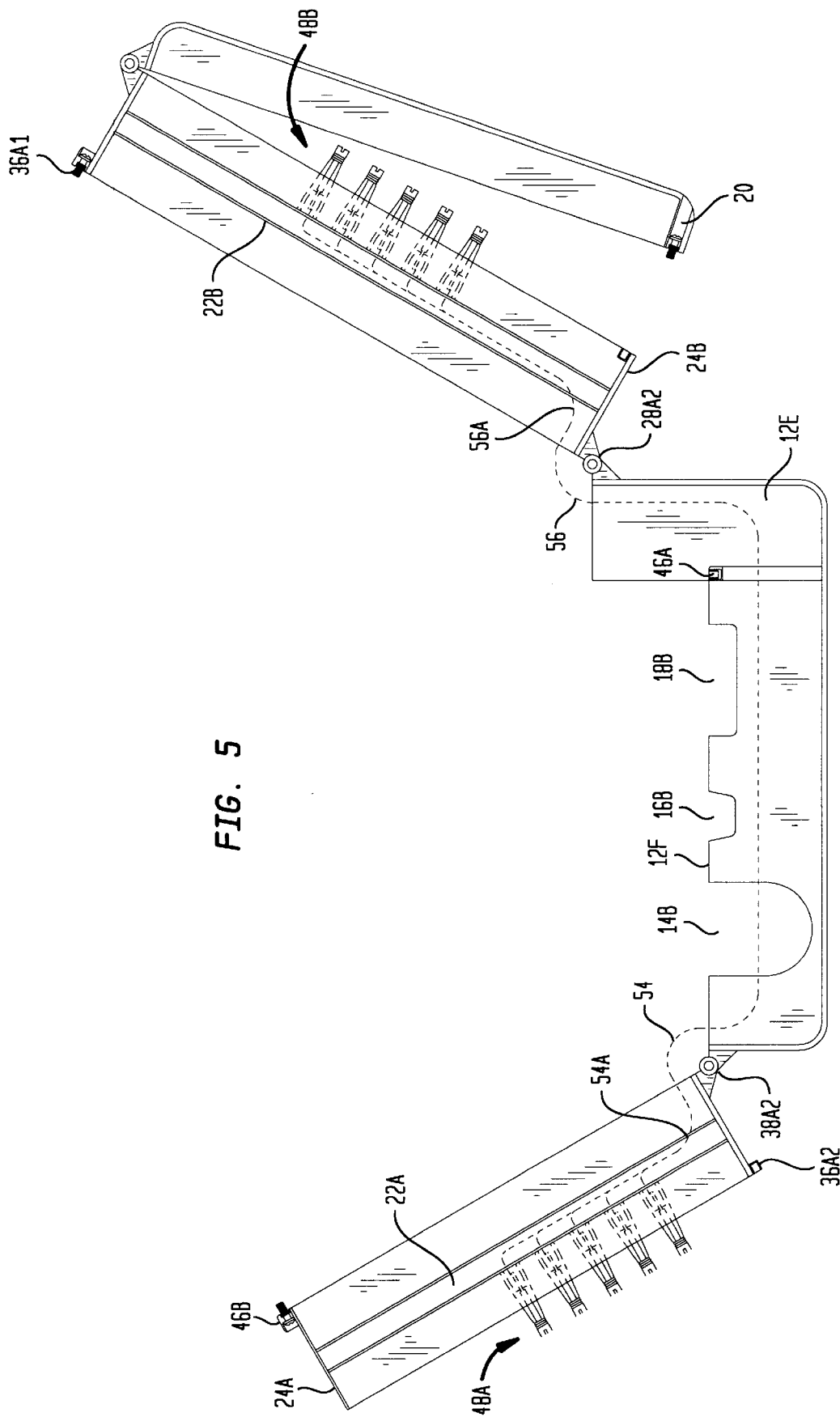

COMPACT MODULAR LAYERED NETWORK INTERFACE UNIT

CROSS REFERENCE TO RELATED APPLICATION

This application is related to U.S. patent application having Ser. No. 09/143,315 also identified by Attorney Docket Number Daoud 120 and is assigned to the same assignee as the present invention.

BACKGROUND OF THE INVENTION

This invention relates to telecommunications apparatus and, in particular, to network interface units and building entrance protector units and having folding capabilities to provide relatively compact units.

Network interface units are known in the art and one such unit is disclosed in U.S. Pat. No. 5,363,440 ('440) of Daoud, and which is herein incorporated by reference. As discussed in the '440 patent, network interface units constitute the demarcation between the customer's equipment and the telephone network. In buildings including multiple subscribers, the network interface unit is typically mounted in a basement and includes an array of customer bridges, each bridge being coupled to an individual subscriber line. The bridges are typically coupled to the phone network through an RJ11 jack and plug so that the customer can plug a working phone into the jack to determine if any problems lie in the customer or network side of the telecommunications system.

Network interface units typically also include a building entrance protector portion which comprises a cable splice chamber and a protector field device for providing surge protection for each customer. Depending on the size or type of the components; e.g., fiber optics, wireless telephone, or coaxial equipment, to be mounted in a network interface unit to accommodate the needs of the customers in the building, the dimensions of the network interface unit may need to be adjusted, requiring various sized housings for different types of components, leading to different sized network interface units. This problem is addressed by the network interface unit having a single designed modular layer, arranged in a building block manner, to provide one device to satisfy the needs of the customers, as well as telecommunication industry, as more fully described in U.S. patent application Ser. No. 09/143,315 having Attorney Docket Daoud 117. Although the network interface unit of U.S. patent application Ser. No. 09/143,315 serves well its intended purpose, there remains a need to provide further network interface units that are even more compact so as to further reduce the overall space which the network interface units occupy.

SUMMARY OF THE INVENTION

The invention in one aspect is a network interface unit for servicing a multiplicity of subscribers.

The network interface unit has a cover portion and services a multiplicity of subscribers. One embodiment of the network interface unit comprises a base portion having first and second sides and a plateau on its first side and a resting surface lower than the plateau and running between the plateau and the second side of the base. The unit, in one embodiment, has a bottom portion mounted on the base portion and includes a splice chamber and an array of protector devices mounted thereon. The splice chamber includes wiring for connecting a cable to the protectors. A plurality of modular layers including a first and at least a second modular layer thereof with each modular layer having first and second sides and including at least an array of customer bridges, each adapted for coupling to a different line of a subscriber. Each array has cabled wiring to electrically connect the customer bridges to the protective devices mounted in the bottom portion. The first modular layer is dimensioned so as to lay on the resting surface of the base with its second side proximate the plateau. The network interface unit further comprises a first and at least the second tray respectively holding the first and second modular layers. The first and second trays each have first and second sides and the first tray is complementary dimensioned relative to the first modular layer and each of the trays has at least one opening at the first side thereof for allowing passage of the respective cabled wiring. The network interface unit further comprises a plurality of hinges each having first and second ends for pivotally interconnecting the plurality of trays, each hinge having said first end attached to a first side of a corresponding tray having the opening. The plurality of hinges includes first and last hinges with the first hinge pivotally joining the first tray and the base portion and said last hinge pivotally joining the second tray and the cover at the second side opposite the opening.

BRIEF DESCRIPTION OF THE DRAWINGS

These and other features of the invention are delineated in detail in the following description. In the drawings:

FIG. 5 illustrates the fold-out capabilities of the modular layers of the present invention.

It will be appreciated that, for purposes of illustration, these figures are not necessarily drawn to scale.

DETAILED DESCRIPTION OF THE PREFERRED EMBODIMENTS

Figure 1:
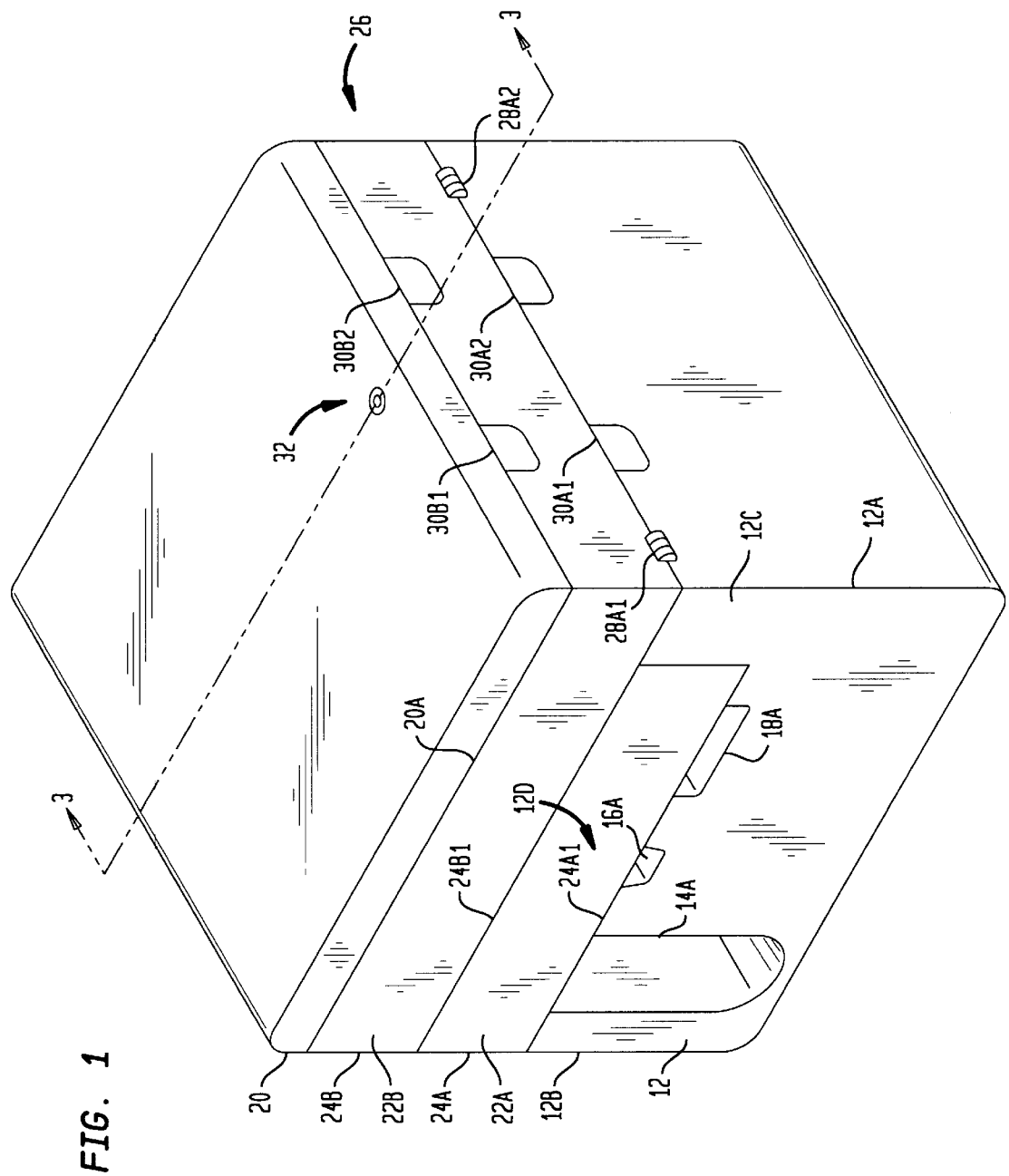
FIG. 1 is a front perspective view of a network interface unit in accordance with an embodiment of the invention and illustrated therein to show the first or hinged side of the network interface unit.

FIG. 1 illustrates primarily the network interface unit 10 in accordance with the invention. The network interface unit 10 embodies a building-block technique and is comprised of modular layers, such as 22A and sets of hinges, such as 28A1–28A2. The modular layers are preferably arranged on trays, such as 24A so that one modular layer folds over another modular layer so as to minimize the overall dimensions and so as to provide a compact network interface unit. As will be described, the trays and modular layers are arranged in a manner similar to a binding of a book so that when the trays are separated from each other the bottom portion of each of the modular layers is exposed so as to provide simultaneous access thereto for maintenance thereof. The modular layers, such as 22A, allow for the mounting of panels or electrical devices thereon and the panels allow for mounting of other components, such as telephone and fiber optic equipment. One of the sides of the network interface unit 10 preferably includes a security mechanism, such as screws and screw receptacles.

The network interface unit 10 of FIG. 1, has a base portion 12 having openings 14A, 16A and 18A all providing passageways for the entrance and/or exit of cabling. The base 12 has first and second sides, 12A and 12B, and a plateau 12C on its first side 12A. The base 12 has a resting surface 12D, lower than the plateau 12C, running between the second side 12B and the plateau 12C. The network interface unit 10 further has a cover portion 20 having a lower edge portion 20A.

The network interface unit 10 further comprises a modular layer 22A and at least a second modular layer 22B, each of which is respectively mounted in trays 24A and 24B, which have lower edge portions 24A1 and 24B1 respectively. Modular layer 22A may contain maintenance test units and layer 22B may contain customer bridges, both known in the art. The first modular layer 22A and the first tray 24A, more particularly, the second ends thereof are each dimensioned so as to lay on the resting surface 12D of the base 12 in a manner to be further described with reference to FIG. 5.

The network interface unit 10 is illustrated in FIG. 1 so as to expose the first side 26 of the network interface unit 10. The network interface unit 10 has a pair of hinges 28A1 and 28A2 that are interconnected to and respectively operatively cooperate with tray 24B and base 12.

The network interface unit 10 further comprises a plurality of openings or windows 30A1 and 30A2, and 30B1 and 30B2, that are used to more advantageously dress the cabling associated with modular layers 22A and 22B. The windows 30A1 ... 30B2, as well as other windows of the network interface unit 10, also provide the means for ingress or egress of cabling associated with the network interface unit 10. The cover 20 further includes a screw and screw receptacle arrangement 32 dimensioned for complementary mating therebetween and that may be used to connect/disconnect the cover 20 to the tray 22B. The network interface unit 10 further comprises a second side 34 which is the opposite side of side 26 which is more clearly illustrated in FIG. 2.

Figure 2:
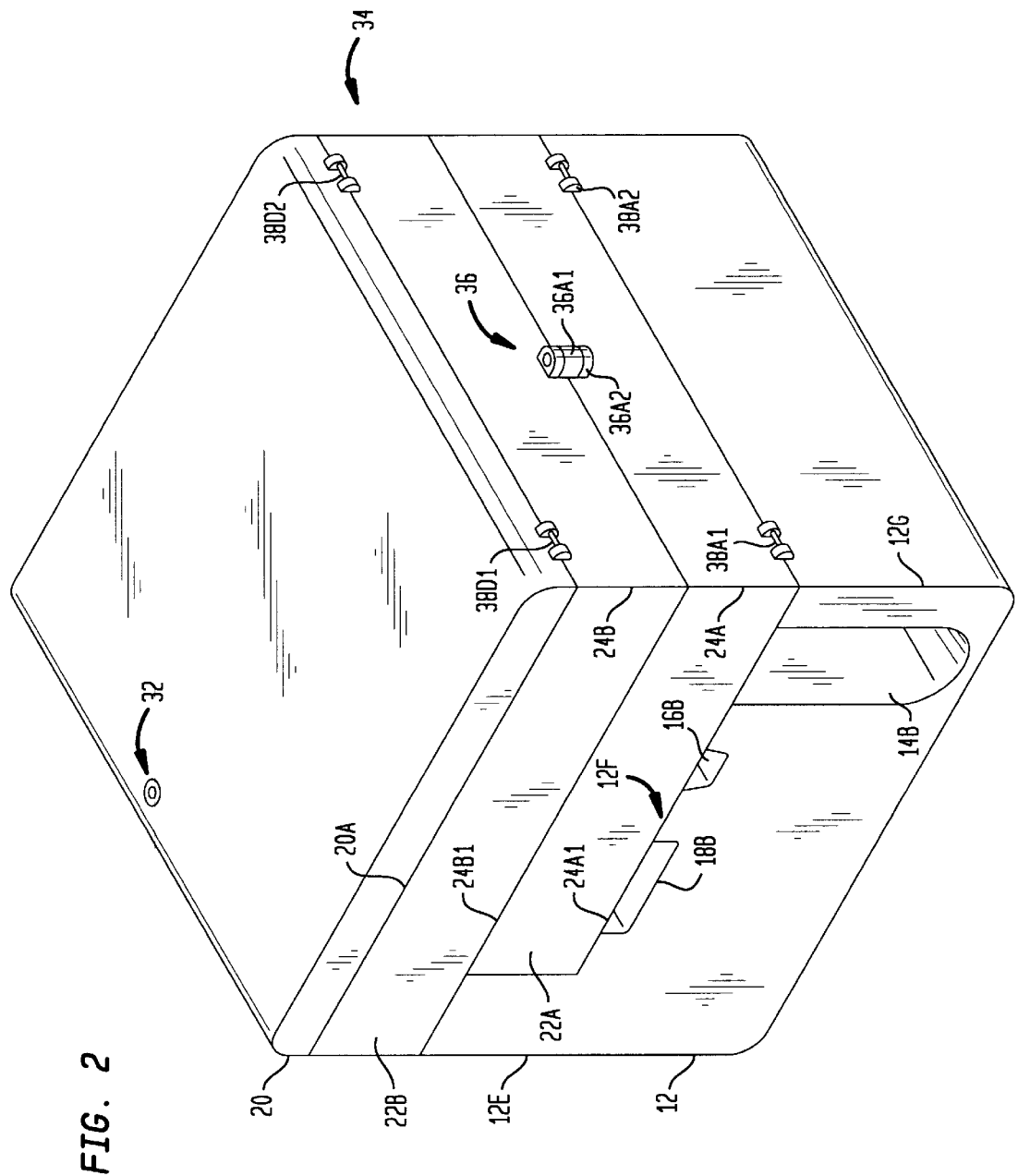
FIG. 2 is a rear perspective view and illustrated to show the second or locking side of the network interface unit.

As seen in FIG. 2, the base 12 has a second plateau 12E which is oppositely located relative to the plateau 12C of FIG. 1 and a second resting surface 12F which is oppositely located relative to the resting surface 12D of FIG. 1 and runs between the plateau 12F and the first side indicated as 12G. The network interface unit 10 further comprises a locking arrangement 36 comprised of receptacles 36A1 and 36A2. The receptacles 36A1 and 36A2 are dimensioned for complementary mating and releasable locking therebetween. As seen in FIG. 2, the locking arrangement 36 is attached between the first tray 24A and the second tray 24B.

The base 12 further comprises hinged arrangements 38A1 and 38A2 and the second tray 24B further comprises hinged arrangements 38D1 and 38D2. The internal components making up the network interface unit 10 may be further described with reference to FIG. 3, which is a view taken along line 3—3 of FIG. 1.

Figure 3:
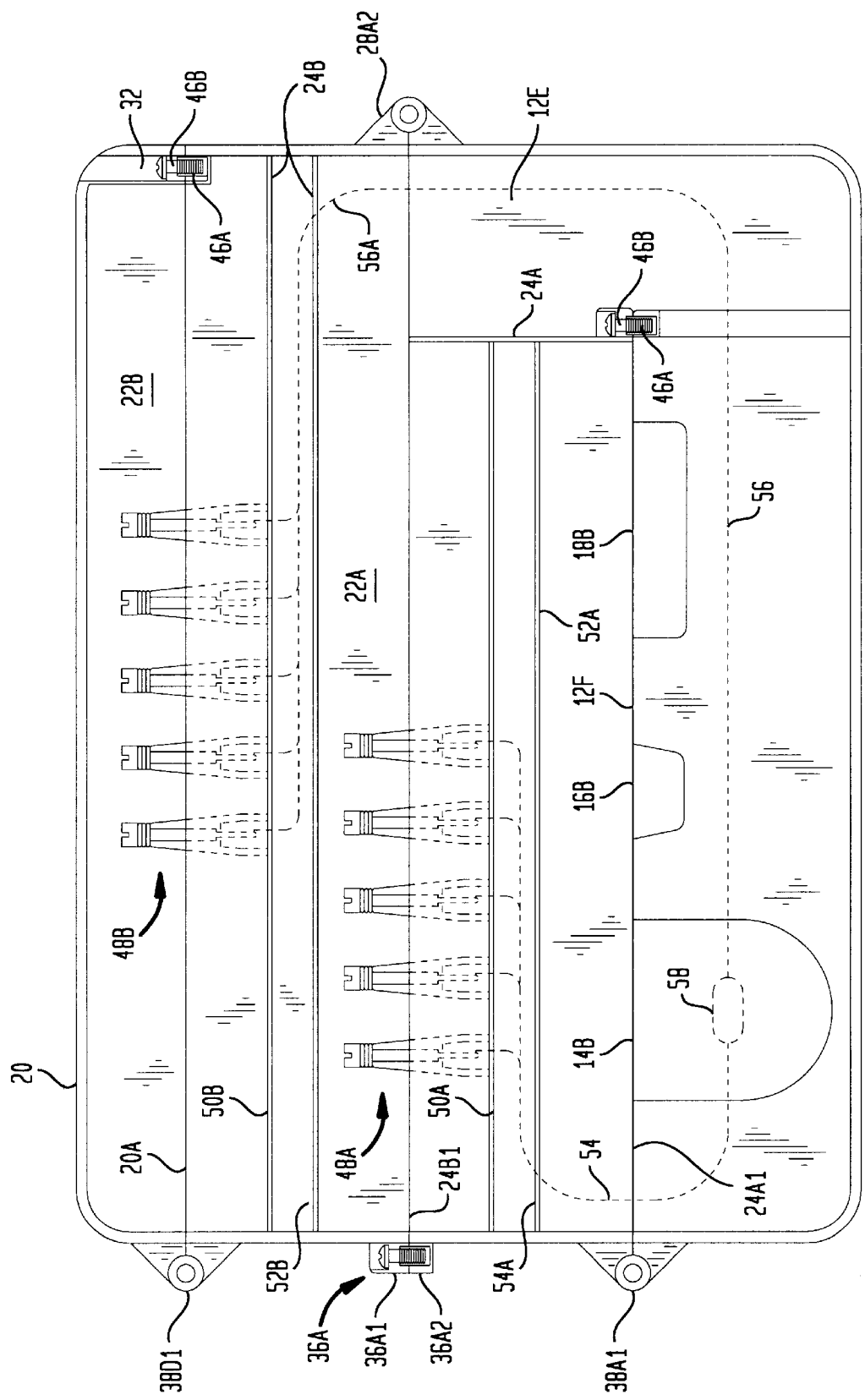
FIG. 3 is a view of the network interface unit taken along line 3—3 of FIG. 1.

FIG. 3 illustrates a screw receptacle 46A and a screw 46B, both part of the screw arrangement 32 of cover 20, and both of which are dimensioned for complementary mating therebetween and with screw receptacle 46A being located in the tray 24B. Further, FIG. 3 illustrates the first tray 24A as having a screw 46B that mates with a screw receptacle 46A attached to the plateau 12E of the base 12.

The modular layers 22A and 22B, respectively are shown as being lodged in trays 24A and 24B and include customer bridges 48A and 48B, which are more fully described in the previously mentioned U.S. Pat. No. 5,363,440.

The modular layers 22A and 22B further include electrical devices 50A–52A, and 50B–52B respectively. These electrical devices 50A–52A and 50B–52B are preferably panels that allow for the mounting of electronic components, such as those components found in telephone and fiber optic equipment. More particularly, the panels 50A . . . 52B may serve as motherboards for the mounting of the data-processing devices.

FIG. 3 further shows cabled wiring for the network interface device 10 comprising cable runs 54 and 56. The cable run 54 represents the wiring to and from the first modular layer 22A and supplies the cabling to and from devices 48A, 50A and 52A. The cable run 56 represents the wiring to and from the second modular layer 22B and supplies the cabling to and from devices 48B, 50B and 52B. The cable runs 54 and 56 further include the cabling for interconnecting the network interface unit 10 to external equipment. The cable run 54 passes through an opening 54A in the first tray 24A and, similarly, the cable run 56 passes through an opening 56A in the second tray 24B. The opening 54A is on the hinge side of tray 24A and, similarly, the opening 56A is on the hinge side of tray 24B. The cable runs 54 and 56 are interconnected to a connector 58 which interconnects, in one embodiment, the customer bridges 48A and 48B to a protective unit 60 which may be further described with reference to FIG. 4.

Figure 4:
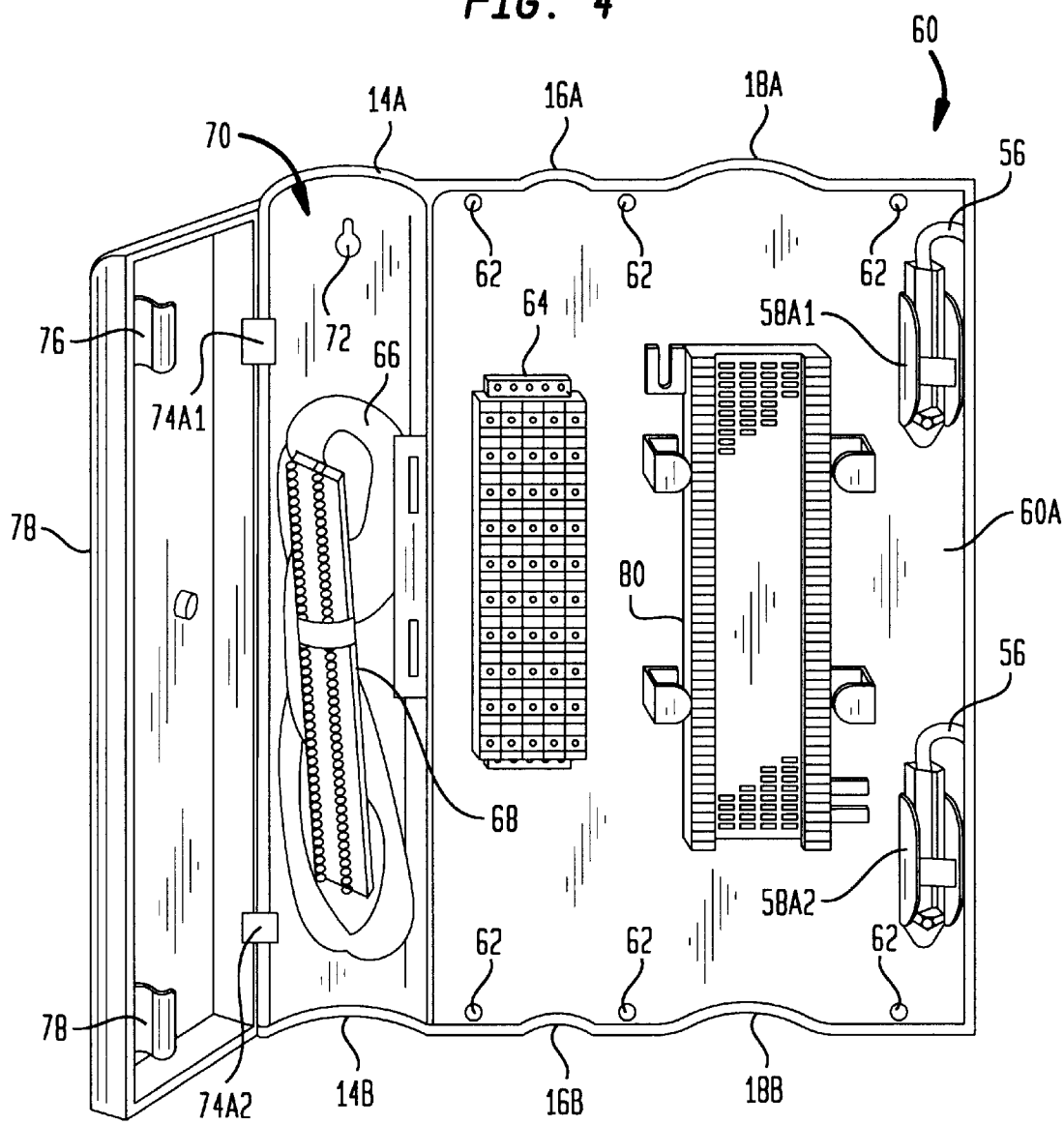
FIG. 4 is a front perspective view of the protector unit in accordance with one embodiment of the present invention.

FIG. 4 illustrates a building entrance protector unit 60, having the cable runs 54 and 56 interconnected thereto by means of connector 58 which is comprised of separate connectors 58A1 and 58A2 both being conventional types. The protector unit 60 is located on base 12 of the network interface unit 10 having the openings 14A, 16A and 18A of FIG. 1 which are respectively arranged in a complementary manner, relative to openings 14B, 16B and 18B of the network interface unit 10. The protector unit 60 is mounted to a frame member 60A by means of fasteners 62, or other equivalent means. The protector unit 60 includes an array 64 of protective devices with each protector device of array 64 being typically a solid state surge arrester which is plugged into a socket (not shown) mounted to the protective unit 60, in particular, the frame member 60A of the protector unit 60. The array 64 of protectors is electrically coupled to a bundle of wires 66 which terminate in a splice connector 68.

The splice connector 68, known in the art, provides the capability for connecting a cable to the protective array 64. The splice connector 68 and the major portion of the wire bundle 66 are situated within a splice chamber 70. The chamber 70 includes the openings 14A and 14B serving as cable passageways, whereas the other openings or cable passageways 16A, 16B, 18A and 18B are located under the protective unit 60. The back wall of the splice chamber 70 includes a hole 72 which permits wall mounting of the network interface unit 10. A cover 74 is mounted, by way of clip members 76 and 78 and hinges 74A1 and 74A2, to the splice chamber 70 to protect the splices formed therein.

Also mounted on the protective unit 60 is a cross-connect or tapping field device 80. Such field device 80, which is standard in the art, includes an array of connectors, each coupled between a protector and an associated customer bridge by way of cable run 54 or 56. By applying jumper cables (not shown) to the connectors, connections can be changed between protectors and customer bridges when, for example, a customer changes his or her location in the building.

The overall benefits of the network interface unit 10 of the present invention may be further described with reference to FIG. 5 which illustrates the arrangement of FIG. 3 in its folded-out positions. From FIG. 5 it is seen that the cable runs 54 and 56 are provided with sufficient slack so that the modular layers 22A and 22B, respectively, may be folded out so as to reveal the components thereof and the wiring and wire wraps thereunder. Such fold-out capabilities allow for any maintenance thereon of the components of all of the modular layers 22A and 22B.

From FIG. 5, it is seen that hinges 28A2 and 38A2 (as well as hinges 28A1 and 38A1 not shown in FIG. 5 but shown in FIG. 1 and 2) are located on opposite sides of trays 24A and 24B but each side of tray 24A and 24B provides an opening for ingress and egress, that is, opening 54A for tray 24A and opening 56A for tray 24B so that the cable runs 54 and 56 extend along the respective hinged side of the network interface unit 10. Further, from FIG. 5 it is seen that the hinges, such as hinge 28A2, have motion limits that define the movement and the open positions of the modular layers 22A and 22B. This motion limit is defined by the two members attached to their associated tray 24A, 24B, base 12 or plateau 12E.

FIG. 5 illustrates the modular layers 22A and 22B operatively interconnected to the hinges 28A2 and 38A2 which allows the modular layers 22A and 22B, by means of trays 24A and 24B, to be separately swung out to their open positions.

From FIG. 5 it is further seen that the network interface unit 10 has fold-over capabilities. More particularly, the first modular layer 22A being carried by the first tray 24A is hingedly arranged so as to swing past the plateau 12E and then lay on the resting surface 12F and, when so resting, the second modular layer 22B being carried by the second tray 24B is hingedly arranged so as to rest on the first tray 24A carrying the first modular layer 22A.

Further, it is seen that if the screw 46B of the first tray 24B is interconnected to the receptacle 46A of base 12, then these elements will be connected. Still further if the screw 36A1 of locking arrangement 36 is interconnected to its receptacle 36A2, then the modular layers 22A and 22B will lay on one another.

Although the previous description referred to separately modular layers 22A and 22B and to trays 24A and 24B, if desired these elements may be merged into one unit so long as the function of each modular layer 22A and 22B and each tray 24A and 24B is provided in accordance with the teaching of the present invention.

It should now be appreciated that the practice of the present invention provides a network interface unit 10 that employs a building block technique, in particular, employs modular layers that may be consecutively arranged or stacked on one another so that the needed components for the network interface unit may be lodged therein, and so that the second modular layer 24B can be laid over the first modular layer to provide a compact unit thereof.

Various additional modifications will become apparent to those skilled in the art. All such variations which basically rely on the teachings to which the invention has advanced the art are properly considered within the scope of this invention.

What I claim is:

1. A network interface unit having a base portion having mounted therein a bottom portion including a splice chamber and an array of protector devices mounted thereon, said splice chamber including wiring for connecting a cable to said protectors, said network interface unit further having a cover and servicing a multiplicity of subscribers, said unit comprising:

said base portion having first and second sides and a plateau on its first side and a resting surface lower than said plateau running between said plateau and said second side of said base;

a plurality of modular layers including first and at least a second modular layer thereof with each modular layer having first and second sides and including at least an array of customer bridges, each adapted for coupling to a different line of a subscriber, each array having cabled wiring to electrically connect the customer bridges to the protective devices mounted in said bottom portion, said first modular layer being dimensioned so as to lay on said resting surface of said base with its second side proximate said plateau;

a plurality of stacked trays having first and at least a second tray thereof and each tray having first and second sides and holding the first and second modular layers, said first tray being complementary dimensioned relative to said first modular layer, each of said trays having at least one opening at said first side thereof for allowing passage of said respective cabled wiring; and a plurality of hinges each having first and second ends for pivotally interconnecting the plurality of trays, each hinge having said first end attached to a first side of a corresponding tray having the opening, said plurality of hinges including first and last hinges with said first hinge pivotally joining the first tray and said base portion and said last hinge pivotally joining the second tray and the cover at the second side opposite the opening.

2. The network interface unit according to claim 1, wherein at least one of said plurality of modular layers further comprises at least one electrical device and said cabled wiring further comprises wiring for electrically connecting said at least one electrical device to said array of customer bridges within its respective modular layer.

3. The network interface unit according to claim 2, wherein said cabled wiring for said at least one electrical device further comprises wiring for electrically connecting said at least one electrical device to said array of protective devices.

4. The network interface unit according to claim 1 further comprising:

a plurality of sets of screws and screw receptacles dimensioned for complementary mating therebetween and said plurality having a first and a last set, said first set having its receptacle mounted to an edge of said resting surface near said plateau of said base and its complementary screw mounted to an edge of said second side of said first tray and said last set having its screw mounted to said second side of said last tray and its receptacle mounted to said first side of said first tray.

5. The network interface unit according to claim 1, wherein said cover has first and second sides and further comprising a cover hinge having first and second ends with the first end of the cover hinge being attached to the second side of said last tray and the second end of the cover hinge being attached to the first side of said cover.

6. The network interface unit according to claim 5 further comprising a cover set of a screw and screw receptacle dimensioned for complementary mating therebetween, said cover receptacle mounted to the first side of said last tray and said cover screw mounted to the second side of said cover.

7. The network interface device according to claim 3, wherein said plurality of hinges have movement limits defined by said first and second ends of said hinges and wherein said plurality of trays have opened positions defined by said movement limits of said hinges.

8. A network interface unit with a cover portion and servicing a multiplicity of subscribers, said unit comprising:

a base portion having first and second sides and a plateau on its first side and resting surface lower than said plateau running between said plateau and said second side of said base;

a plurality of modular layers including first and at least a second modular layer thereof with each modular layer having first and second sides and including at least an array of customer bridges, each adapted for coupling to a different line of a subscriber, each array having cabled wiring to electrically connect the customer bridges to the protective devices mounted in said bottom portion, said first modular layer being dimensioned so as to lay on said resting surface of said base with its second side proximate said plateau;

a plurality of stacked trays having first and at least a second tray thereof and each tray having first and second sides and holding the first and second modular layers, said first tray being dimensioned relative to the first modular layer and each of the trays has at least one opening at said first side thereof for allowing passage of the respective cabled wiring;

a plurality of hinges, each having first and second ends for pivotally interconnecting the plurality of trays, each hinge having said first end attached to a first side of a corresponding tray having the opening, said plurality of hinges includes first and last hinges with said first hinge pivotally joining the first tray and the base portion and said last hinge pivotally joining the second tray and the cover at the second side opposite the opening.

9. The network interface unit according to claim 8, wherein at least one of said plurality of modular layers further comprises at least one electrical device and said cabled wiring further comprises wiring for electrically connecting said at least one electrical device to said array of customer bridges within its respective modular layer.

10. The network interface unit according to claim 8 further comprising:

a plurality of sets of screws and screw receptacles dimensioned for complementary mating therebetween and said plurality having a first and a last set, said first set having its receptacle mounted to an edge of said resting surface near said plateau of said base and its complementary screw mounted to an edge of said second side of said first tray and said last set having its screw mounted to said second side of said last tray and its receptacle mounted to said first side of said first tray.

11. The network interface unit according to claim 8, wherein said cover has first and second sides and further comprising a cover hinge having first and second ends with the first end of the cover hinge being attached to the second side of said last tray and the second end of the cover hinge being attached to the first side of said cover.

12. The network interface unit according to claim 11 further comprising a cover set of a screw and screw receptacle dimensioned for complementary mating therebetween, said cover receptacle mounted to the first side of said last tray and said cover screw mounted to the second side of said cover.

13. The network interface device according to claim 9, wherein said plurality of hinges have movement limits defined by said first and second ends of said hinges and wherein said plurality of trays have opened positions defined by said movement limits of said hinges.

* * * * *